(12) United States Patent
Sorrentino

(10) Patent No.: US 11,426,823 B2
(45) Date of Patent: Aug. 30, 2022

(54) COVERED ELECTRODE FOR ARC WELDING HIGH STRENGTH STEEL

(71) Applicant: Lincoln Global, Inc., Santa Fe Springs, CA (US)

(72) Inventor: Stefano Sorrentino, Rome (IT)

(73) Assignee: LINCOLN GLOBAL, INC., Santa Fe Springs, CA (US)

(*) Notice: Subject to any disclaimer, the term of this patent is extended or adjusted under 35 U.S.C. 154(b) by 0 days.

(21) Appl. No.: 17/035,307

(22) Filed: Sep. 28, 2020

(65) Prior Publication Data
US 2022/0097180 A1 Mar. 31, 2022

(51) Int. Cl.
*B23K 35/30* (2006.01)
(52) U.S. Cl.
CPC .................. *B23K 35/3066* (2013.01)
(58) Field of Classification Search
None
See application file for complete search history.

(56) References Cited

U.S. PATENT DOCUMENTS

| | | | | |
|---|---|---|---|---|
| 2,408,320 A * | 9/1946 | Kuhlik | ................. | G11B 3/36 369/53.39 |
| 2,408,620 A * | 10/1946 | Friedlander | ........ | B23K 35/3086 219/137 WM |
| 2,990,301 A * | 6/1961 | Clemens, Jr. | ...... | B23K 35/3086 428/563 |
| 3,453,142 A * | 7/1969 | Dorschu | ............ | B23K 35/365 428/389 |
| 3,620,830 A * | 11/1971 | Kramer | ................ | B23K 35/365 219/145.23 |
| 8,269,144 B2 | 9/2012 | Kapoor et al. | | |
| 9,895,774 B2 | 2/2018 | Barhorst et al. | | |
| 2019/0308281 A1* | 10/2019 | Craciun | ............ | B23K 35/404 |

FOREIGN PATENT DOCUMENTS

EP 2952287 B1 * 8/2017 ............. C22C 38/02

OTHER PUBLICATIONS

Blodgett et al., "Fabricators' and Erectors' Guide to Welded Steel Construction", The James F. Lincoln Arc Welding Foundation. Dated 1999 in 58 pages.
"Covered (Stick) Electrodes (SMAW) Low Alloy Electrodes" Fact Sheet, ESAB. Dated Jul. 6, 2020 in 1 page.
Jastrzebska et al., "Effect of Electrode Coating Type on the Physico-chemical Properties of Slag and Welding Technique", Biuletyn Instytutu Spawalnictwa. Dated 2015, pp. 37-46.
(Continued)

*Primary Examiner* — Elizabeth Collister
(74) *Attorney, Agent, or Firm* — Knobbe Martens; Brad C. Spencer

(57) ABSTRACT

The disclosed technology generally relates welding electrodes, and more particularly to covered consumable welding electrodes. In an aspect, a consumable welding electrode comprises a core wire comprising a steel composition and a coating formed on the core wire. The coating comprises weld metal alloying elements comprising Fe, C, Mn, Si, Ni, Mo, V and Cr that are arranged such that an undiluted weld metal formed from the covered welding electrode has a combination of high tensile strength and high impact strength.

22 Claims, 5 Drawing Sheets

(56) References Cited

OTHER PUBLICATIONS

Kah et al., "Welding of Ultra High Strength Steels", Advanced Materials Research, vol. 849. Dated 2014, pp. 357-365.
Keehan, "Effect of Microstructure on Mechanical Properties of High Strength Steel Weld Metals", Department of Experimental Physics, Chalmers University of Technology and Goteborg University. Dated 2004 in 72 pages.
"Phoenix SH Ni 2 K 130" Fact Sheet, T Phoenix Union Thermanit. Dated Jul. 2012 in 1 page.
Ramirez, "Characterization of High-Strength Steel Weld Metals: Chemical Composition, Microstructure, and Nonmetallic Inclusions" Welding Journal, vol. 87. Dated Mar. 2008 in 11 pages.
Sham et al., "Flux-Coating Development for SMAW Consumable Electrode of High-Nickel Alloys", Supplement to The Welding Journal, vol. 93. Dated Aug. 2014 in 11 pages.
"Stick Electrode properties and techniques" Welding Guide, Lincoln Electric The Welding Experts. Dated Mar. 2011 in 44 pages.
Wei et al., "Evading the strength-ductility trade-off dilemma in steel through gradient hierarchical nanotwins", Nature Communications. Dated Apr. 1, 2014 in 9 pages.

* cited by examiner

COVERED ELECTRODE FOR ARC WELDING HIGH STRENGTH STEEL

BACKGROUND

Field

The disclosed technology generally relates fusion arc welding electrodes, and more particularly to covered consumable welding electrodes.

Description of the Related Art

Various fusion arc welding technologies utilize consumable welding electrodes that serves as a source of the weld metal. For example, in metal arc welding, an electric arc is established when a voltage is applied between a consumable weld electrode, which serves as one electrode that advances towards a workpiece, and the workpiece, which serves as another electrode. The arc melts a tip of the metal wire and the baseplate, thereby producing droplets of the molten metal electrode that deposit onto the workpiece to form a weld metal or weld bead.

Technological and economic demands on welding technologies continue to grow in complexity, with the need for higher manufacturing flexibility and the need for higher mechanical performance coexisting. In addition, optimization of one performance parameter of the weld metal can compromise another. Some welding technologies aim to address these competing demands by improving the consumables, e.g. by improving the physical designs and/or compositions of the consumable electrodes. The disclosed technology addresses a need for improved consumable welding electrodes for high strength steels.

SUMMARY

In a first aspect, a covered arc welding electrode comprises a core wire comprising a steel composition and a coating formed on the core wire. The coating comprises, on the basis of a total weight of the coating, alloying elements comprising: Fe at 15-45 weight %, C at 0.20-0.40 weight %, Mn at 1.0-3.0 weight %, Si at 3.0-8.0 weight %, Ni at 3.0-8.0 weight %, Mo at 0.80-2.3 weight %, Cr at 0.20-0.80 weight % and V at 0.0001-0.050 weight %.

In a second aspect, a covered arc welding electrode comprises a core wire comprising a steel composition. The core wire comprises, on the basis of a total weight of the core wire, alloying elements comprising: Mn at 0.30-0.70 weight %, Si at 0.030-0.070 weight %, and C at 0.03-0.090 weight %. The covered welding electrode further comprises a coating formed on the core wire. The coating comprises alloying elements comprising Fe, C, Mn, Si, Ni, Mo, Cr and V. One or more of Fe, Si, Mo, Mn, C and Cr are present in the form of one or more ferroalloys, and one or more of Fe, Mn, Ni and C are present in the form of elemental metals.

In a third aspect, a covered welding electrode comprises a core wire comprising a steel composition and a coating formed on the core wire. The coating comprises weld metal alloying elements comprising Fe, C, Mn, Si, Ni, Mo, V and Cr that are arranged such that an undiluted weld metal formed from the covered welding electrode has a tensile strength >960 MPa and an impact strength >69 J at −60° C.

DETAILED DESCRIPTION

Figure 1:
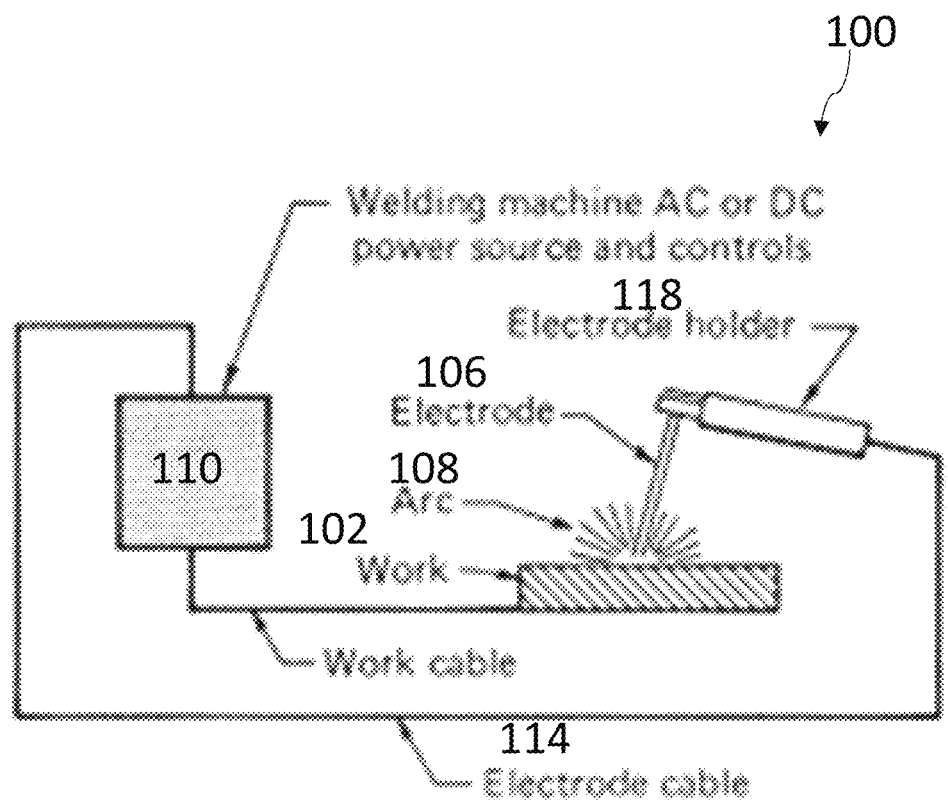
FIG. 1 illustrates an arc welding system that can be used in conjunction with consumable electrodes according to embodiments disclosed herein.

Yield strength is a measure of the stress that a metal can withstand before permanently deforming. Tensile strength is a measure of the maximum stress that a metal can support before starting to fracture. Steels having high strength or ultrahigh strength, e.g., yield strength over 560 MPa and/or tensile strength over 700 MPa, make it possible to produce structures that find a wide range of applications including, e.g., construction machines, automobiles, trucks, pipelines, ships, lightweight constructions and highly loaded welded structures. Advantageous properties of high strength and ultrahigh strength steels, such as high strength and toughness levels as well as good shaping and deformation behavior, enable their utilization in the above mentioned industries. These desirable properties of high strength and ultrahigh strength steels can be achieved by employing certain alloying elements and metallurgical strengthening mechanisms such as grain refinement, precipitation hardening, solid solution hardening, transformation hardening and dislocation hardening. Examples of high strength and ultrahigh strength steels having such high yield and tensile strengths include quenched and tempered steels, direct quenched steels, thermo-mechanical control process steels, high strength and ultrahigh strength low alloy steels and other advanced high strength steels (e.g., dual phase, complex phase, martensitic steels etc.), among others.

Despite the superior properties of high strength/ultrahigh strength steels, manufacturing using such steels can be limited by the availability of a suitable welding technology. Welding of these materials have been known to suffer from various technological challenges, including high susceptibility to cracking and heat affected zone (HAZ) softening, which can significantly affect the quality and strength of the welded joint.

The selection of a suitable welding electrode as a filler material with respect to the base metal to obtain sufficient weld strength can greatly affect the quality of the weld joint. Depending on the welding process and the welding parameters, dilution of the weld metal from the parent plate in the weld pool occurs, which can be as much as 15% and 30% relative to the undiluted weld metal. As a result, the chemistry of the weld and consequently its properties can differ from the chemistry and properties of the pure filler metal with its improved mechanical data. Thus, the filler metal is selected with consideration of such dilution effects in order to have a good quality weld.

A further challenge associated with the selection of a suitable welding electrode that produces a suitably matching tensile/yield strength for the high strength/ultrahigh strength components relates to obtaining a weld metal that does not suffer from compromised impact strength as a result of the improved tensile/yield strength. Impact strength refers to a capability of a material to withstand a suddenly applied load. While tensile/yield strength and impact strength are both important mechanical properties, optimizing the weld metal for one is often linked with a degradation of the other. For example, typical impact toughness requirements in use today for high strength applications include at least 47 J at −20° C., e.g., for some shipbuilding applications, and at least 47 J at −40° C., down to 69 J at −60° C., for some offshore constructions. Temperature requirements are typically set at least 30° C. below the expected service temperature in many applications. However, optimizing a weld metal to meet these performance requirements while having a tensile strength exceeding 700 MPa has been challenging.

A further challenge associated with the selection of a suitable welding wire as a filler material for high strength/ultrahigh strength components is minimizing the risk of hydrogen cracking. Hydrogen cracking generally takes place below about 200° C. upon cooling of the weldments, and the cracks may form up to several days after welding. The cracks can appear in the heat effected zone (HAZ), where there is martensite, accumulation of hydrogen and high stresses. In some high strength steel weld metals, the cracks can form in the weld metal itself. While the mechanism of hydrogen cracking is not fully understood, it is believed to be dependent on the presence of hydrogen, high residual stresses, and/or a susceptible microstructure such as martensite having low ductility. Thus, low hydrogen filler materials may be desirable to prevent the occurrence of various weld defects including hydrogen induced cracking. For example, to control cold cracking, welding consumables that suppress introduction of hydrogen into the heat affected zone and produce a weld metal insensitive to hydrogen may be desirable.

To address these and other needs, embodiments disclosed herein relate to welding consumable electrodes having chemical and physical arrangements capable of producing a weld metal that has high or ultrahigh tensile strength (e.g., >960 MPa) while also having high impact strength (e.g., >69 J at −60° C.) and ultralow diffusible hydrogen content (e.g., <3 ml/100 g). Various embodiments of the welding electrodes disclosed herein have a coating, e.g., a concentric coating, formed around a core wire, e.g., an elongated cylindrical wire, having a steel composition. The coating can serve various functions including, e.g., providing alloying elements, fluxing, slag-forming, gas forming, stabilizing the arc and deoxiding the molten weld pool, among other functionalities. According to various embodiments, the coating can include iron (Fe) and one or more of C, Mn, Si, Ni, Mo, Cr and V. The consumable welding electrodes disclosed herein can be implemented, without limitation, in various arc welding processes disclosed herein.

Arc Welding Processes for Welding High Strength/Ultrahigh Strength Steel

Arc welding is one of several fusion processes for joining metals. By applying intense heat, metal at the joint between two parts is melted and caused to intermix—directly, or more commonly, with an intermediate molten filler metal.

A arc-welding system 100 that can be used in conjunction with embodiments disclosed herein is illustrated in FIG. 1. A power source system 110 including AC or DC power source and controls, is connected by a work cable 114 to a workpiece 102 to be welded and by a "hot" cable to an electrode holder 118, which makes an electrical contact with the welding electrode 106. An arc is created across a gap between the workpiece 102 and the welding electrode 106 when the energized circuit and the electrode tip touches the workpiece 102 and is withdrawn, yet still with in close contact. The electric arc may be created between the welding electrode 106, which may be a consumable electrode, which serves as one electrode (e.g., anode (+) in DC), and the workpiece 102, which serves as another electrode (e.g., cathode (−) in DC). After initiation of the arc, a plasma 108 is sustained, which contains neutral and ionized gas molecules, as well as neutral and charged clusters or droplets of the material of the metal wire that have been vaporized by the arc. The welding electrode 106 advances towards the work piece 102, and the molten droplets of the metal wire deposits onto the workpiece, thereby forming a weld bead or weld metal. The arc can produce a temperature as high as about 6500° F. at the tip. This heat melts both the workpiece 102 and the welding electrode 106, producing a pool of molten metal sometimes called a "crater." The crater solidifies behind the electrode as it is moved along the joint. Upon cooling and solidification, a metallurgical bond is created. Since the joining is an intermixture of metals, the final weldment can have comparable or substantially the same mechanical properties, e.g., strength, as the metal of the parts of the workpiece 102. This is in notable contrast to non-fusion processes of joining (e.g., soldering, brazing, etc.) in which the mechanical and physical properties of the base materials may not be comparable to the workpiece 102 at the joint.

Metals at high temperatures tend to react chemically with elements in the air—oxygen and nitrogen. When the metal in the molten pool comes into contact with air, oxides and nitrides may form, which can negatively affect the strength and toughness of the weld joint. Therefore, some arc-welding processes provide some means of covering the arc and the molten pool with a protective shield of gas, vapor, and/or slag. This is called arc shielding. This shielding reduces or minimizes contact of the molten metal with air. Shielding also may improve the weld. An example is a flux, which can include deoxidizers for the weld metal.

In welding, the arc not only provides the heat needed to melt the electrode and the base metal, but under certain conditions must also supply the means to transport the molten metal from the tip of the electrode to the work. Several mechanisms for metal transfer exist. Examples include a surface tension transfer in which a drop of molten metal touches the molten metal pool and is drawn into it by surface tension, and a spray arc in which the drop is ejected from the molten metal at the electrode tip by an electric pinch propelling it to the molten pool.

When the electrode 106 is a consumable electrode as disclosed herein, the tip melts under the heat of the arc and molten droplets are detached and transported to the work piece 102 through the arc column. Arc welding in which an electrode according to embodiments described herein is melted off to become part of the weld is described as metal-arc welding. This is in contrast to carbon or tungsten (TIG) welding, in which there are no molten droplets to be forced across the gap and onto the work. Filler metal is melted into the joint from a separate rod or wire. More of the heat developed by the arc is transferred to the weld pool with consumable electrodes. This produces higher thermal efficiencies and narrower heat-affected zones.

Arc welding may be performed with direct current (DC) with the electrode either positive (DCEP) or negative (DCEN) or alternating current (AC). The choice of current and polarity depends on the process, the type of electrode, the arc atmosphere, and the metal being welded.

In processes using a consumable electrode, the electrode or the wire melts to provide an additive metal that fills a gap to form a weld joint that joins two metal workpieces. The welding processes using consumable electrodes include shielded metal arc welding (SMAW), gas metal arc welding (GMAW) or metal inert gas (MIG) welding, flux-cored arc welding (FCAW), metal-cored arc welding (MCAW), and submerged arc welding (SAW), among others. The welding processes using consumable welding electrodes can be carried out in direct current electrode positive (DCEP) mode, direct current electrode negative (DCEN) mode, or alternating current (AC) mode. In a DCEP mode, a direct current is used and the wire is connected to the positive terminal of the power source and the workpiece(s) or plate(s) to be welded is connected to the negative terminal, and vice versa when welding in a DCEN mode. In an AC mode, the wire and the workpiece(s) or plate(s) switches from positive to negative in cycles depending on a frequency. The terminal that serves as a positive electrode may be referred to as an anode and the terminal that serves as a negative electrode may be referred to as a cathode. In the following, various consumable electrode-based welding processes that can be implemented with oxide-coated welding wires according to embodiments are described.

Figure 2:
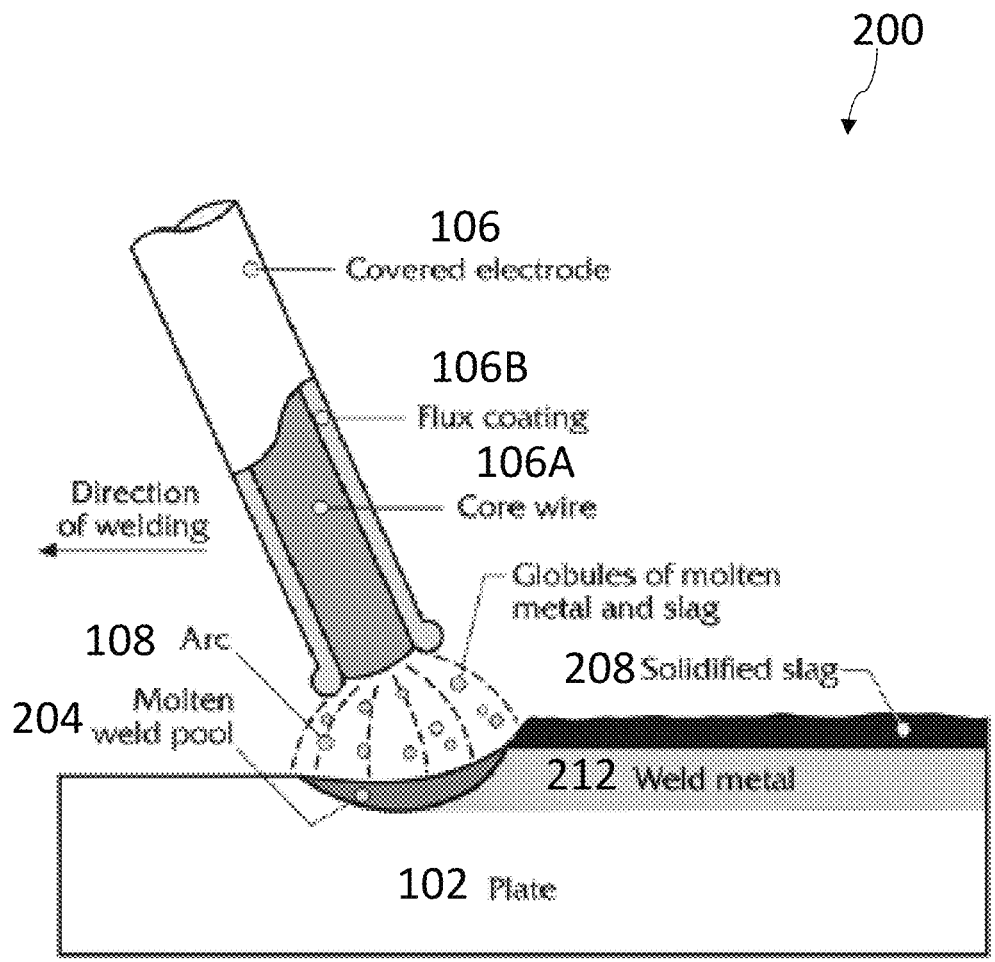
FIG. 2 illustrates a process of welding using a consumable electrode according to embodiments disclosed herein.

FIG. 2 illustrates a shielded metal arc welding (SMAW) process 200, sometimes referred to as manual metal arc (MMA) welding process, which can be used in conjunction with embodiments disclosed herein. In a SMAW process, the electrode 106 can be a covered or coated electrode, sometimes referred to as a stick electrode. The covered electrode 106 includes a core wire 106A that is covered by a coating 106B. When an arc 108 is struck between the electrode 106 and the workpiece 102, both the covered electrode 106 and the surface of the workpiece 102 evaporate to form globules of metal and slag from the covered electrode 106 that is transferred to the surface of the workpiece 102, thereby forming a weld pool 204 including the metal of the covered electrode 106 and the metal of the workpiece 102, and a slag 208. The combination of the core wire 106A and the coating 106B includes a filler material for the joint and intricate compounds designed for controlling the arc 108, creating a protective slag 208 and generating a protective gas shroud that shields the weld pool 204 from the atmosphere. Simultaneous melting of the core wire 106A and the coating 106B forms the gas and slag 208, the combination of which protects the weld pool 204 from the surrounding atmosphere. Upon cooling, the slag 208 is chipped off the weld metal 212 once the weld run is complete or before the next weld pass is deposited.

Still referring to FIG. 2, the coating 106B includes compounds for providing a shielding gas at the point of contact while the slag 208 protects the fresh weld from the air. The coating 106B can include a flux of one of three main types: cellulosic, rutile and basic or a mixture thereof. For welding high strength and ultrahigh strength metals as disclosed herein, the coating 106B can advantageously be of basic character, which can advantageously generate low amounts of diffusible hydrogen, which in turn leads to lower risk of hydrogen cracking described above. The flux contains different quantities of minerals, depending on the arc characteristics and the desired weld geometry to be produced (e.g., ability to perform satisfactorily in various welding positions).

Figure 3:
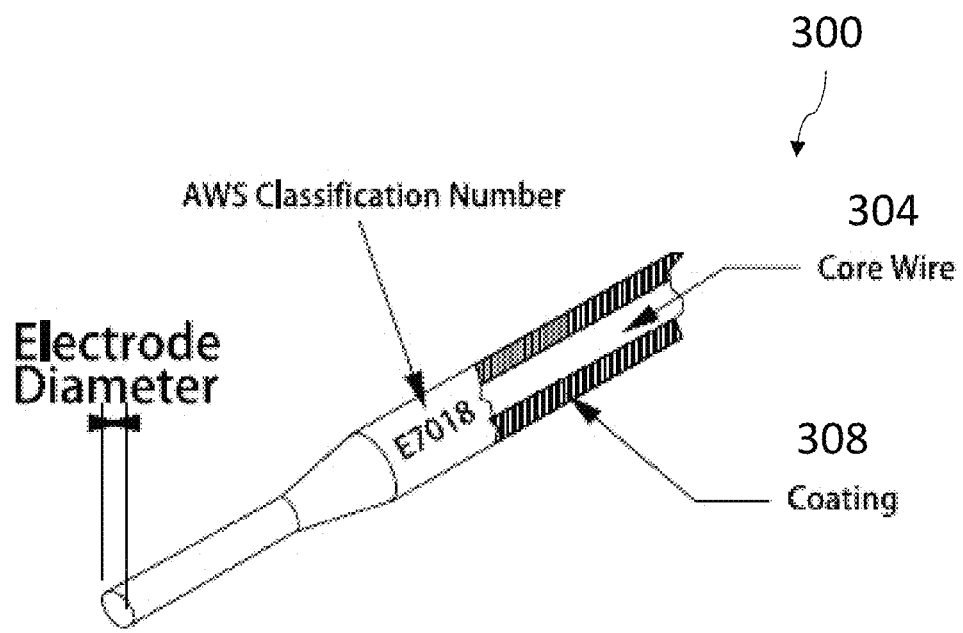
FIG. 3 illustrates a covered welding consumable electrode according to embodiments.

FIG. 3 illustrates a covered welding consumable electrode 300 according to various embodiments. The electrode 300 comprises a core wire 304 and a coating 308. The core wire 304 can include a suitable carbon steel which, when coated with the coating 308, the resulting weld metal can advantageously have a combination of high tensile strength and high impact strength. The chemical elements and compounds of the core wire 304 and the coating 308 disclosed herein can be distinguished based on whether or not the constituent element is incorporated as part of the alloy of the weld metal. In the following, elements that are substantially incorporated into the resulting weld metal may be referred to as alloying elements, while elements that are substantially not incorporated into the resulting weld metal for rather serve other functions, such as slag or gas forming or arc-stabilizing, may be referred to as non-alloying elements.

As described above, a weld metal can include solidified metal of the work piece as well as the metal of the consumable electrode. Because the amount of dilution or concentration of elements in the weld metal due to incorporation of molten work piece can vary considerably, unless otherwise indicated, the weight percentages of various elements and compounds in the weld metal as disclosed herein refer to those of undiluted weld metals that would be obtained if no dilution or concentration would have occurred from the work piece.

Weld Metal Alloying Elements and Compounds

The core wire 304 includes a carbon steel composition. The carbon steel composition according to various embodiments includes Fe and one or more of C, Mn and Si at concentrations greater than impurity levels. A substantial portion of these elements are incorporated into the weld metal. In some embodiments, the core wire 304 comprises a low carbon steel. In these embodiments, the core wire 304 includes, on the basis of a total weight of the core wire 304: Mn at a weight percentage of 0.01-1.00%, 0.10-0.90%, 0.20-0.80%, 0.30-0.70%, 0.40-0.60%, 0.45-0.55% or a value in a range defined by any of these values, for instance 0.50%; Si at a weight percentage of 0.01-1.00%, 0.01-0.80%, 0.01-0.60%, 0.01-0.40%, 0.01-0.20%, 0.01-0.10%, 0.02-0.08%, 0.03-0.07% or a value in a range defined by any of these values, for instance 0.05%; and C at a weight percentage of 0.01-1.00%, 0.01-0.80%, 0.01-0.60%, 0.01-0.40%, 0.01-0.20%, 0.01-0.10%, 0.03-0.09%, 0.05-0.07% or a value in a range defined by any of these values, for instance 0.06%. In these embodiments, there may be additional elements that may be present at an impurity level. As described herein, an impurity level refers to a weight percentage of an element that is not intentionally introduced but is nevertheless present, which can be generally less than 0.05%. Impurities that are not intentionally added but nevertheless be present in the core wire 304 include S, P, Al, Cu, N, Cr, Ni, Mo, V, Nb and Ti. The balance of the weight of the core wire 304 can be Fe.

Still referring to FIG. 3, the coating 308 includes Fe and one or more of C, Mn, Si, Ni, Mo, Cr and V at concentrations greater than impurity levels. A substantial amount of these elements are incorporated into the weld metal as alloying elements. According to various embodiments, the coating 308 includes, on the basis of a total weight of the coating 308, Fe at a weight percentage lower than the weight percentage of Fe in the core wire 304, which can be 15-45%, 20-40%, 25-35%, 28-32%, or a value in a range defined by any of these values, for instance 30%; Mn at a weight percentage higher than the weight percentage of Mn in the core wire 304, which can be 0.1-4.0%, 0.5-3.5%, 1.0-3.0%, 1.5-2.5%, 2.0-2.3%, or a value in a range defined by any of these values, for instance 2.1%; Si at a weight percentage higher than the weight percentage of Si in the core wire 304, which can be 2.5-8.5%, 3.0-8.0%, 3.5-7.5%, 4.0-7.0%, 4.5-6.5%, 5.0-6.0%, 5.3-5.9% or a value in a range defined by any of these values, for instance 5.6%; and C at a weight percentage higher than the weight percentage of C in the core wire 304, which can be 0.01-1.00%, 0.01-0.80%, 0.01-0.60%, 0.10-0.50%, 0.20-0.40%, 0.25-0.35%, 0.27-0.33%, or a value in a range defined by any of these values, for instance 0.30%. The coating 308 additionally comprises, on the basis of the total weight of the coating 308, Ni at a weight percentage of 2.5-8.5%, 3.0-8.0%, 3.5-7.5%, 4.0-

7.0%, 4.5-6.5%, 5.0-6.0%, 5.5-5.9% or a value in a range defined by any of these values, for instance 5.7%; Mo at a concentration of 0.1-3.0%, 0.5-2.5%, 0.8-2.3%, 1.0-2.0%, 1.3-1.7%, or a value in a range defined by any of these values, for instance 1.5%; and Cr at a concentration of 0.01-1.00%, 0.10-0.90%, 0.20-0.80%, 0.30-0.70%, 0.40-0.60%, 0.45-0.55% or a value in a range defined by any of these values, for instance 0.50%.

The inventors have discovered that the chemical and physical arrangement in which various elements are present in the coating 308 can influence their effectiveness in providing the various technical effects and advantages described herein. Without being bound to any theory, this may be due to, among other factors, bond energies and temperature needed to dissociate them for forming the weld metal.

According to embodiments, the source of Fe can include one or both of elemental and alloyed forms of Fe. For example, the source of Fe can include elemental Fe and/or one or more ferroalloys. When present in elemental form, the Fe metal may be present in powder form at a weight percentage of 15-45%, 20-40%, 25-35% or a value in a range defined by any of these values, for instance 28.1%, on the basis of the total weight of the coating 308. The inventors have recognized that the Fe powder can be particularly effective when present in a plurality of size distributions. In some implementations, the Fe powder may be present in relatively coarse and relatively fine size distributions. An average diameter of fine Fe particles may be, e.g., 1-50 µm, 50-100 µm, 100-150 µm, 150-200 µm, 200-250 µm or a value in a range defined by any of these values. An average diameter of coarse Fe particles may be, e.g., 200-250 µm, 250-300 µm, 300-350 µm, 350-400 µm, 400-500 µm or a value in a range defined by any of these values. A ratio of the number of fine Fe particles to the number of coarse Fe particles according to various implementations may be, on the basis of the total weight of the coating 308, 0.2, 0.4, 0.6, 0.8 or a value in a range defined by any of these values. For example, fine Fe powder may be present at a weight percentage of 5-35%, 10-30%, 15-25%, or a value in a range defined by any of these values, for instance 19.6%. For example, coarse Fe powder may be present at a weight percentage of, on the basis of the total weight of the coating 308, 1-20%, 5-15%, 5-10%, or a value in a range defined by any of these values, for instance 8.5%.

As described herein, a ferroalloy refers to an alloy formed by Fe and one or more elements, and may be designated as FeA, FeAB, etc., where A and B refer to alloying elements. The ratio of Fe to the alloying elements can be 1 to 99%. When one or more ferroalloys are present, the ferroalloy(s) may include one or more of ferroalloys including C, Mn, Si, Ni, Mo, Cr and V. For example, the ferroalloys of FeSi, FeCr, FeCrC, FeMnC, FeMo and/or FeV may be present in powder form, on the basis of the total weight of the coating 308, at various weight percentages described below.

According to embodiments, the source of C can include one or both of elemental and alloyed forms of carbon. For example, the source of C can include graphite powder and/or FeMnC alloy powder. When C is present in elemental form, it may be present in the form of graphite powder at a weight percentage of 0.01-0.4%, 0.05-0.35%, 0.10-0.30%, 0.15-0.25% or a value in a range defined by any of these values, for instance 0.20%, on the basis of the total weight of the coating 308. When present in alloy form, the FeMnC alloy powder can be present at 0.01-3.0%, 0.5-2.5%, 1.0-2.0%, 1.0-1.5% or a value in a range defined by any of these values, for instance 1.2%, on the basis of the total weight of the coating 308.

Without being bound to any theory, the presence of C, when present in the form and amounts in the core wire 304 and/or the coating 308 as described herein, can be critical to obtaining the desired tensile strength and impact strength, as well as fracture toughness, hardness and ductility of the weld metal, among other properties. In particular, when present at concentrations greater than the amount described above, the martensite transformation temperature may be lowered to an undesirable level. A lowered martensite transformation temperature may in turn lead to an increased amount of martensite with higher carbon in the HAZ correlated with a higher risk of hydrogen cracking and lower impact strength or fracture toughness. The relatively low amount of carbon as described herein can also advantageously lower the risk of solidification cracking.

According to embodiments, the source of Mn can include one or both of elemental and alloyed forms of Mn. For example, the source of Mn can include Mn metal powder and/or FeMnC alloy powder. When present in elemental form, the Mn metal powder can be present at a weight percentage 0.01-3.0%, 0.5-2.5%, 1.0-2.0%, 1.2-1.6% or a value in a range defined by any of these values, for instance 1.4%, on the basis of the total weight of the coating 308. When present, the FeMnC alloy powder can be present, at 0.01-3.0%, 0.5-2.5%, 1.0-2.0%, 1.0-1.5% or a value in a range defined by any of these values, for instance 1.2%, on the basis of the total weight of the coating 308.

According to embodiments, the source of Ni can include one or both of elemental and alloyed forms of Ni. For example, the source of Ni can include Ni metal powder and/or Ni alloy powder. When present in elemental form, the Ni metal powder can be present a weight percentage of 2.5-8.5%, 3.0-8.0%, 3.5-7.5%, 4.0-7.0%, 4.5-6.5%, 5.0-6.0%, 5.5-5.9% or a value in a range defined by any of these values, for instance 5.7%, on the basis of the total weight of the coating 308.

Without being bound to any theory, the presence of Mn and Ni, when present in the form and amounts in the core wire 304 and/or the coating 308 as described herein, can be critical to obtaining the desired yield strength, impact strength and fracture toughness, among other properties. For example, the disclosed amounts of these elements can reduce the formation of δ-ferrite and promote the solidification of the weld metal directly to austenite. Mn can provide strengthening through solid solution hardening and grain refinement by lowering the austenite-to-ferrite transformation temperature. Grain refinement also leads to increased toughness. At concentrations and arrangements different from those disclosed herein, Mn can segregate and lead to variations in hardness and microstructure, and also form inclusions that may be detrimental to the toughness. Under some circumstances, Mn can also reduce the risk of solidification cracking. Ni can also improves toughness, increase the solid solution hardening effect and increases quench hardenability. Ni can also influence the stacking fault energy of ferrite in such a manner that plastic deformation is accommodated at low temperatures. Mn can also serve as a deoxidizer which removes oxygen from the weld pool and reduces weld metal porosity.

According to embodiments, the source of Si can include one or both of elemental and alloyed forms of Si. For example, the source of Si can include elemental Si powder and/or Si alloy powder such as FeSi. When present in alloy form, the FeSi metal powder can be present at a concentration of 2.5-8.5%, 3.0-8.0%, 3.5-7.5%, 4.0-7.0%, 4.5-6.5%, 5.0-6.0%, 5.0-5.5% or a value in a range defined by any of these values, for instance 5.1%, on the basis of the total weight of the coating 308.

Without being bound to any theory, the presence of Si, when present in the form and amounts in the core wire 304 and/or the coating 308 as described herein, can be critical to obtaining the desired yield strength and impact strength, among other properties. Silicon contributes a large solid solution hardening factor. The relative high silicon concentration can improve fracture toughness in the weld metal comprising bainitic steel phases. Silicon can also serve as a deoxidizer, removing oxygen from the weld, and reduce the chance of weld metal porosity. In general, the higher the level of silicon in the metal, the more fluid the weld puddle.

According to embodiments, the source of Mo can include one or both of elemental and alloyed forms of Mo. For example, the source of Mo can include elemental Mo metal powder and/or FeMo alloy powder. When present in alloy form, FeMo powder can be present at a weight percentage 0.01-4.0%, 0.5-3.5%, 1.0-3.0%, 1.5-2.5%, 2.0-2.3% or a value in a range defined by any of these values, for instance 2.3%, on the basis of the total weight of the coating 308.

According to embodiments, the source of Cr can include one or both of elemental and alloyed forms of Cr. For example, the source of Cr can include elemental Cr metal powder and/or FeCr alloy powder. When present in alloy form, FeCr powder can be present at a weight percentage 0.01-2.0%, 0.01-1.5%, 0.01-1.0%, 0.5-1.0% or a value in a range defined by any of these values, for instance 0.8%, on the basis of the total weight of the coating 308.

Without being bound to any theory, the presence of Mo and Cr, when present in the form and amounts in the coating 308 as described herein, can be critical to obtaining the desired yield strength and impact strength, among other properties. Cr can stabilize ferrite. Cr can increase the hardness and strength and have a greater influence when manganese is at low concentrations. Cr can provide solid solution strengthening and promotes carbide formation. Cr can also increase hardenability and enhance both oxidation and corrosion resistance of the weld metal. Cr and Mo can increase resistance to high temperature corrosion and provide resistance against creep in heat resistant steels.

According to embodiments, the source of V can include one or both of elemental and alloyed forms of V. For example, the source of V can include V metal powder and/or FeV alloy powder. When present in alloy form, the FeV powder can be present at a weight percentage 0.005-0.2%, 0.01-0.1%, 0.015-0.030%, or a value in a range defined by any of these values, for instance 0.03%, on the basis of the total weight of the coating 308. When present in elemental form, the V metal powder can be present at a weight percentage 0.0075-0.1%, 0.01-0.1%, 0.015-0.030%, or a value in a range defined by any of these values, for instance 0.015%, on the basis of the total weight of the coating 308.

Without being bound to any theory, the presence of V, when present in the form and amounts in the coating 308 as described herein, can be critical to obtaining the desired yield strength and impact strength, among other properties. V can form precipitates in the form of carbonitrides that can contribute to strength through precipitation hardening.

Non-Alloying Compounds in the Coating

Still referring to FIG. 3, the coating 308 can be a source of alloying elements for the weld metal. In addition, According to various embodiment, additional compounds may be present in the coating 308 of the welding electrode 300 to serve other purposes, including providing a shielding gas and a slag, as described above with respect to FIG. 2.

According to various embodiments, the coating 308 may be one of cellulose, rutile, and basic (low-hydrogen) types, depending on the application, considering factors such as how quickly the slag freezes, penetration, deposition rate, arc initiation, easy restrikes, puddle control, and a stable arc with minimal spatter, among other considerations.

For mission critical applications such as providing critical welds in bridges, ships, and offshore oil and gas applications, as well as military applications, the coating 308 may be basic, to offer an arc with medium penetration and excellent mechanical properties. The coating 308 is a low-hydrogen coating having a medium thickness that freezes relatively fast to enable flat, horizontal, vertical-up, and overhead welding.

According to various embodiments, in addition to various alloying elements or compounds described above, the coating 308 additionally comprises one or more agents that serve as a fluxing agent, slag former, a gas former, an arc stabilizer and/or molten weld metal deoxidant. As described herein, a fluxing agent and a slag former impart controlled properties to the slag, such as slag viscosity, surface tension and melting point. As described herein, a gas former produces, when heated, gases such as carbon dioxide ($CO_2$), carbon monoxide (CO), and water vapor ($H_2O$) at the high temperature of the welding arc. As described herein, an arc stabilizer imparts a conductive path for the flow of current through the plasma generated by the arc. As described herein, a molten weld metal deoxidant reduces oxygen by forming compounds with oxygen and volatizing. According to various embodiments described herein, one or more of $CaCO_3$, $CaF_2$, $MgF_2$, $SiO_2$, $TiO_2$ and $Li_2CO_3$ can be added to serve as one or more of a fluxing agent or slag former, a gas former and/or an arc stabilizer.

According to embodiments, the coating 308 comprises calcium carbonate ($CaCO_3$) at a weight percentage of 15.0-40.0%, 20.0-35.0%, 25.0-30.0% or a value in a range defined by any of these values, for instance 27.2%, on the basis of the total weight of the coating 308. When present, $CaCO_3$ serves as a fluxing agent, slag former and/or a gas former. For example, without being bound to any theory, $CaCO_3$ may decompose in the arc into CaO which serves as the slag and $CO_2$, which serves as a shielding gas.

The inventors have recognized that the $CaCO_3$ powder can be particularly effective when present in a plurality of size distributions. In some implementations, the $CaCO_3$ powder may be present in relatively coarse and relatively fine size distributions. The inventors have realized that the technical effects described above may be particularly advantageous when the fine $CaCO_3$ particles are in the form of mineral calcite. An average diameter of fine $CaCO_3$ particles, which may be calcite powder, may be, e.g., 1-50 μm, 50-100 μm, 100-150 μm, 150-200 μm, 200-250 μm or a value in a range defined by any of these values. An average diameter of coarse $CaCO_3$ particles may be, e.g., 200-250 μm, 250-300 μm, 300-350 μm, 350-400 μm, 400-500 μm or a value in a range defined by any of these values. A ratio of the number of fine $CaCO_3$ particles to the number of coarse $CaCO_3$ particles according to various implementations may be 0.2, 0.4, 0.6, 0.8 or a value in a range defined by any of these values. For example, fine $CaCO_3$ powder may be present at a weight percentage of 7.0-21.0%, 9.0-19.0%, 11.0-17.0%, 12.0-15% or a value in a range defined by any of these values, for instance 13.5%, on the basis of the total weight of the coating 308. For example, coarse $CaCO_3$ powder may be present at a weight percentage of 7.0-21.0%, 9.0-19.0%, 11.0-17.0%, 12.0-15% or a value in a range defined by any of these values, for instance 13.7%, on the basis of the total weight of the coating 308

According to some embodiments, the coating 308 comprises calcium fluoride ($CaF_2$) at a weight percentage of 8.0-24.0%, 10.0-22.0%, 12.0-20.0%, 14.0-18% or a value in a range defined by any of these values, for instance 16.1%, on the basis of the total weight of the coating 308. When present, $CaF_2$ serves as a fluxing agent and/or slag former. For example, in the arc, without being bound to any theory, $CaF_2$ may combine with oxygen to form CaO and release $F_2$, which may advantageously combine with diffusive hydrogen to form HF, which volatizes, thereby reducing hydrogen cracking. The inventors have realized that when $CaF_2$ is present in the form of the mineral fluorite, it may particularly be effective to serve these functions.

According to some embodiments, the coating 308 additionally comprises silicon oxide (e.g., $SiO_2$) at a weight percentage of 0.1-4.0%, 0.5-3.5%, 1.0-3.0%, 1.5-2.5% or a value in a range defined by any of these values, for instance 2.0%, on the basis of the total weight of the coating 308. When present, $SiO_2$ serves as a fluxing agent and/or slag former. For example, in the arc, without being bound to any theory, some $SiO_2$ may react with $CaF_2$ to form CaO and release gaseous $SiF_4$, which volatizes. The inventors have realized that when $SiO_2$ is present in the form of the mineral quartz, it may be particularly be effective.

According to some embodiments, the coating 308 additionally comprises titanium oxide ($TiO_2$) at a weight percentage of 2.5-7.5%, 3.0-7.0%, 3.5-6.5%, 4.0-6.0% or a value in a range defined by any of these values, for instance 5.0%, on the basis of the total weight of the coating 308. When present, $TiO_2$ serves as a slag former and an arc stabilizer.

According to some embodiments, the coating 308 additionally comprises magnesium fluoride ($MgF_2$) at a weight percentage of 0.1-4.0%, 0.5-3.5%, 1.0-3.0%, 1.5-2.5% or a value in a range defined by any of these values, for instance 1.7%, on the basis of the total weight of the coating 308. When present, $MgF_2$ serves as a molten steel deoxidant to remove oxygen and/or nitrogen therefrom, as well as an arc stabilizer.

According to some embodiments, the coating 308 additionally comprises lithium carbonate ($Li_2CO_3$) at a weight percentage of 0.01-2.0%, 0.1-1.5%, 0.5-1.5%, 0.7-1.3% or a value in a range defined by any of these values, for instance 1.0%, on the basis of the total weight of the coating 308. When present, lithium carbonate serves as an arc stabilizer.

The coating 308 additionally comprises one or more agents that serve as a binder. As described herein, binders form a plastic mass of coating material capable of being extruded and baked. The final baked coating should be sufficiently hard so that it will maintain a crater and have sufficient strength so that it will not spall, crack or chip. Binders are also used to make coating non-flammable and avoid premature decomposition. According to various embodiments described herein, the coating 308 comprises a binder comprising one or more of a sodium silicate, a potassium silicate and sodium hydroxide, that is present in the amount of 20-60 kg of the binder per 100 kg of dry coating, 30-50 kg of the binder per 100 kg of dry coating, 35-45 kg of the binder per 100 kg of dry coating or amount in range defined by any of these values, for instance 42.8 kg of the binder per 100 kg of dry coating.

The coating 308 additionally comprises one or more polymers that serve as an extrusion agent. According to embodiments, the coating 308 comprises sodium carboxymethyl cellulose that serves as an extrusion agent and present at a weight percentage of 0.01-2.0%, 0.1-1.5%, 0.5-1.5%, 0.7-1.3% or a value in a range defined by any of these values, for instance 1.0%, on the basis of the total weight of the coating 308.

In addition to various alloying elements described above, the coating 308 comprises, on the basis of the total weight of the coating 308 the following non-alloying elements that form a gas and/or a slag: Ti at a weight percentage of 1.5-4.5%, 2.0-4.0%, 2.5-3.5% or a value in a range defined by any of these values, for instance 2.8%; Ca at a weight percentage of 10-30%, 15-25%, 18-22%, or a value in a range defined by any of these values, for instance 20%; Na at a weight percentage of 0.01-2.0%, 0.1-1.5%, 0.5-1.0% or a value in a range defined by any of these values, for instance 0.8%; Mg at a weight percentage of 0.01-2.0%, 0.1-1.5%, 0.5-1.0% or a value in a range defined by any of these values, for instance 0.8%; K at a weight percentage of 0.01-2.0%, 0.5-2.0%, 1.0-1.5%, for instance 1.3%; and Li at a weight percentage of 0.01-1.0%, 0.1-0.8%, 0.1-0.5%, for instance 0.3%.

Still referring to FIG. 3, according to various embodiments, the core wire 304 can have a diameter of 1/16 in. (1.6 mm), 3/32 in. (2.5 mm), 1/8 in. (3.2 mm), 5/32 in. (4.0 mm), 3/16 in. (5.0 mm), or a diameter in a range defined by any of these values, for instance 3.2 mm. The core wire 304 may have a length of 250 mm, 300 mm, 350 mm 400 mm, 450 mm, 500 mm, or a length in a range defined by any of these values. The coating 308 can have a thickness of 1-1.5 mm, 1.5-2.0 mm, 2.0-2.5 mm, 2.5-3.0 mm, or a thickness in a range defined by any of these values, for instance 1.2 mm By way of examples only, an electrode having a core wire diameter of 3.2 mm and a coating thickness of 1.2 mm can have an overall diameter of 5.6 mm; and an electrode having a core wire diameter of 4.0 mm and a coating thickness of 1.35 mm can have an overall diameter of 6.7 mm According to various embodiments, the coating 308 can have a weight percentage, on the basis of a total weight of the electrode 300, of 10-15%, 15-20%, 20-25%, 25-30%, 30-35%, 35-40%, or a value in a range defined by any of these values.

Still referring back to FIG. 3, the electrode 300 having the core wire 304 and the coating 308 physically and chemically configured as described herein can form, according to embodiments, a weld metal having one or more of, on the basis of a total weight of weld metal (FIG. 2), Mn at a weight percentage of 0.1-2.0%, 0.5-1.5%, 0.8-1.3%, 0.9-1.1% or a value in a range defined by any of these values, for instance 1.0%; Si at a weight percentage of 0.01-1.0%, 0.01-0.8%, 0.1-0.7%, 0.2-0.6%, 0.3-0.5%, 0.35-0.45%, or a value in a range defined by any of these values, for instance 0.4%; C at a weight percentage of 0.001-0.50%, 0.001-0.40%, 0.001-0.30%, 0.001-0.20%, 0.01-0.16%, 0.04-0.12%, 0.06-0.09% or a value in a range defined by any of these values, for instance 0.07%; Ni at a weight percentage of 1.0-5.0%, 1.5-4.5%, 2.5-4.0%, 2.7-3.9%, 2.9-3.8%, or a value in a range defined by any of these values, for instance 3.1%; Mo at a weight percentage of 0.1-3.0%, 0.1-2.5%, 0.1-2.0%, 0.4-0.12%, 0.6-0.10%, 0.75-0.85% or a value in a range defined by any of these values, for instance 0.8%; Cr at a weight percentage of 0.01-1.0%, 0.01-0.8%, 0.1-0.6%, 0.1-0.5%, 0.2-0.4%, 0.25-0.35%, or a value in a range defined by any of these values, for instance 0.30%; V a weight percentage of 0.0001-0.050%, 0.0050-0.025%, 0.01-0.020%, or a value in a range defined by any of these values, for instance 0.0120%. While these elements may be present in the weld metal as a result of tuning the specific chemical and physical arrangement of the electrode 300 as described herein, the weld metal may contain additional elements at impurity levels. For example, the additional elements that may be present at impurity levels may include any element that is included as part of the non alloying elements, including one or more of P, S, Al, Nb, Ti, B and Co.

As described above, hydrogen cracking can limit the performance of weld metals that form filler metals for high strength and ultrahigh strength steels. By employing, among other things, the electrode 300 including the coating 308 as described herein, advantageously low diffusible hydrogen content in the weld metal can be achieved. For example, as formed using electrodes according to embodiments described herein, the amount of diffusible hydrogen in the weld metal can be <15 ml/100 g weld metal, <10 ml/100 g weld metal, <5 ml/100 g weld metal, <3 ml/100 g weld metal, or a value in a range defined by any of these values.

The electrode 300 can advantageously form, according to embodiments, a weld metal having a tensile strength exceeding 600 MPa, 700 MPa, 800 MPa, 900 MPa, 950 MPa, 1000 MPa, 1000 MPa, 1050 MPa, 1100 MPa or a value in a range defined by any of these values, e.g., 960 MPa or 975 MPa. Simultaneously, the electrode 300 can form the weld metal having an impact strength, as measured using, e.g., a Charpy impact test at −60° C., that can exceed 65 J, 70 J, 75 J, 80 J, 85 J, or a value in a range defined by any of these values, e.g., 69 J. The electrode 300 can form the weld metal having an impact strength, when measured at −70° C., that can exceed 45 J, 50 J, 55 J, 60 J, 65 J, or a value in a range defined by any of these values, e.g., 47 J. It will be appreciated that the tensile strength and the impact strength of a weld metal can be inversely proportional, and it is the combination of high impact strength and high impact strength that is achieved by weld metals formed using electrodes described herein that render the electrodes particularly inventive.

The electrode 300 can advantageously form, according to embodiments, a weld metal having a relatively low ductile brittle transition temperature (DBTT) of below −100° C., below −90° C., below −80° C., below −70° C., below −60° C., below −50° C., below −40° C. or a value in a range defined by any of these values.

The electrode 300 can advantageously form, according to embodiments, a weld metal having a relatively high upper shelf impact strength that can exceed 80 J, 85 J, 90 J, 95 J, 100 J, 105 J, 110 J, or a value in a range defined by any of these values, for instance 93 J. As described herein, an upper shelf impact strength describes materials which show a relatively sharp transition in impact strength within a temperature region circa the DBTT, while the impact strength is relatively slow-varying outside of the temperature region circa the DBTT. The DBTT temperature region can encompass a temperature range of, e.g., less than 100° C., 80° C., 60° C., 40° C. or a value in a range defined by any of these values, with a median temperature within the region corresponding to the DBTT. The DBTT can in turn be defined as a temperature at which the measured impact strength is 60 J. Alternatively, the DBTT can be defined as a temperature at which the notch impact energy corresponds to 50% of the upper shelf impact strength.

Figure 4A:
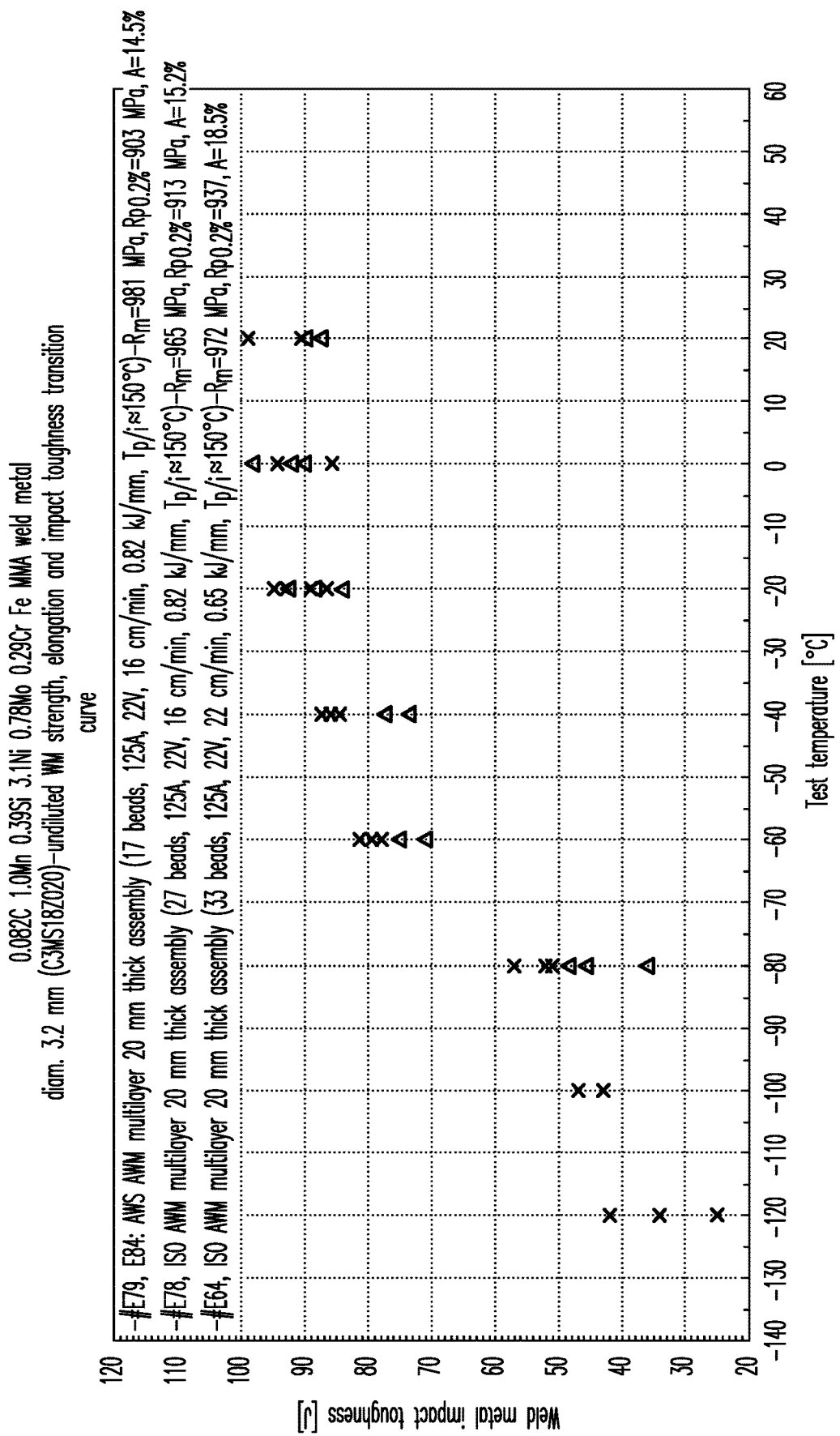
FIGS. 4A and 4B illustrate experimental measurements of tensile and impact strengths at various temperatures of weld metals formed using a consumable electrode according to an embodiment.
Figure 4B:
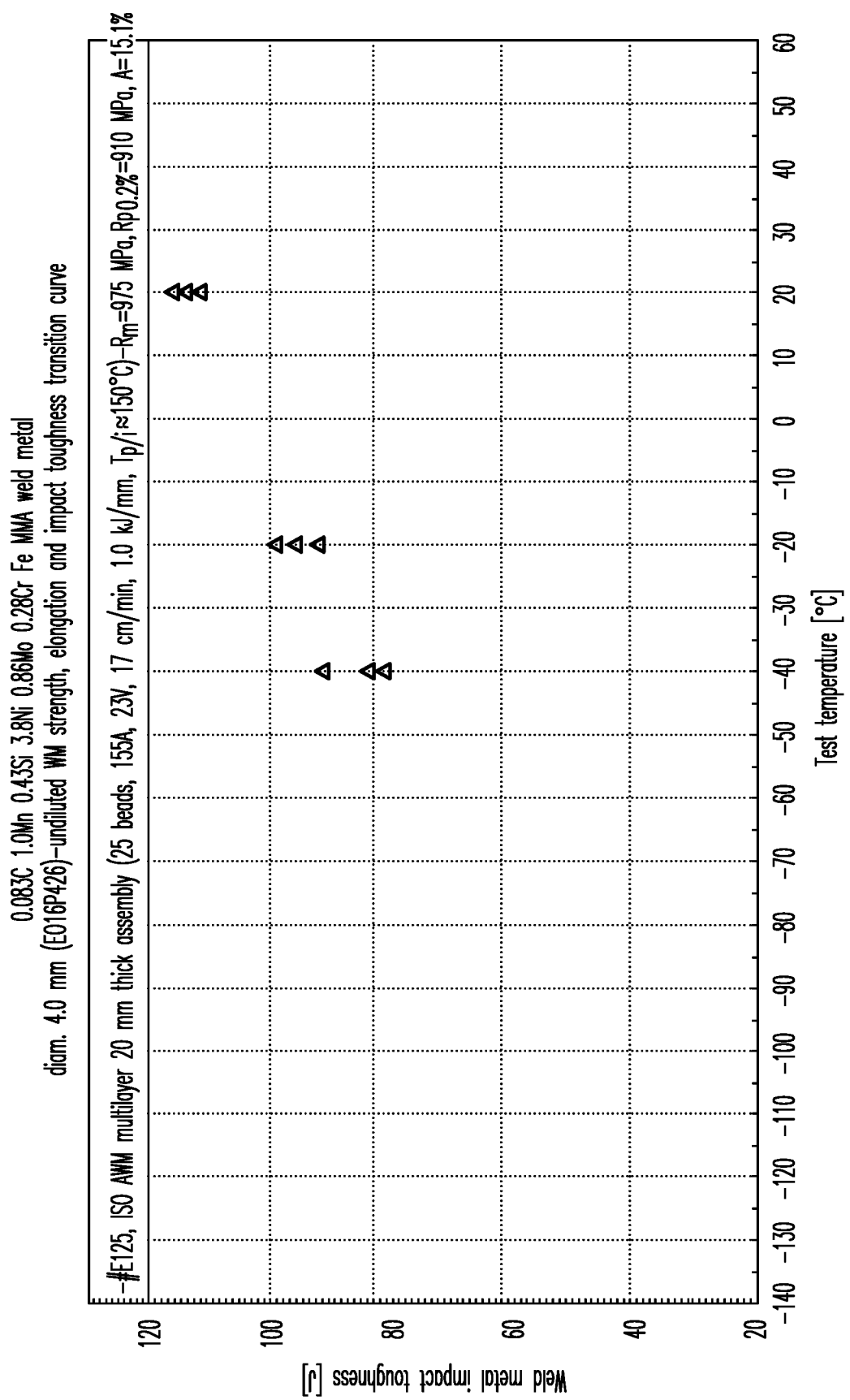

FIGS. 4A and 4B illustrate experimental measurements of tensile and impact strengths of 2 consumable electrodes according to embodiments, at various temperatures. The measurements were performed on a weld metal formed from a 3.2 mm (FIG. 4A) and a 4.0 mm (FIG. 4B) diameter electrodes. The weld metals from 3.2 mm diameter electrodes (FIG. 4A) have, on the basis of the total weight of the weld metal, 0.082 weight % C, 1.0 weight % Mn, 0.39 weight % Si, 3.1 weight % Ni, 0.78 weight % Mo, 0.27 weight % Cr, and the balance of Fe. The weld metals measured were formed on a multilayer assembly using 150° C. interpass temperature, 125 A of current and 22V under a DCEP mode, with travel speed of 16 cm/min (heat input 0.82 kJ/mm) or 22 cm/min (heat input 0.65 kJ/mm). The weld metals from 4.0 mm diameter electrodes (FIG. 4B) have, on the basis of the total weight of the weld metal, 0.083 weight % C, 1.0 weight % Mn, 0.43 weight % Si, 3.8 weight % Ni, 0.86 weight % Mo, 0.28 weight % Cr, and the balance of Fe. The weld metals measured were formed on a multilayer assembly using 150° C. interpass temperature, 155 A of current and 23V under a DCEP mode, with travel speed of 17 cm/min (heat input 1.00 kJ/mm).

The inventors have observed that the weld metals produced using the consumable electrodes descried herein include a mixture of martensite, lower bainite and acicular ferrite. The inventors have recognized that the presence of acicular ferrite is found to be correlated to impact toughness. Acicular ferrite can generally be shaped as randomly oriented lenticular plates and have needle shape in two dimensional sectional view. The dimensions of acicular ferrite can be 1 to 10 µm in in length and around 1 µm in diameter. Without being bound to any theory, acicular ferrite may be associated with high toughness due to its ability to defect cracks during propagation.

Unless the context clearly requires otherwise, throughout the description and the claims, the words "comprise," "comprising," "include," "including" and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number, respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or whether these features, elements and/or states are included or are to be performed in any particular embodiment.

While certain embodiments have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. Each of these blocks may be implemented in a variety of different ways. Any suitable combination of the elements and acts of the various embodiments described above can be combined to provide further embodiments. The various features and processes described above may be implemented independently of one another, or may be combined in various ways. All possible combinations and subcombinations of features of this disclosure are intended to fall within the scope of this disclosure.

What is claimed is:

1. A covered arc welding electrode, comprising:
a core wire comprising a steel composition; and
a coating formed on the core wire, the coating comprising, on the basis of a total weight of the coating, alloying elements comprising:
Fe at 15-45 weight %;
C at 0.20-0.40 weight %;
Mn at 1.0-3.0 weight %;
Si at 3.0-8.0 weight %;
Ni at 3.0-8.0 weight %;
Mo at 0.80-2.3 weight %;
Cr at 0.20-0.80 weight %; and
V at 0.0001-0.050 weight %.

2. The covered welding electrode of claim 1, wherein the core wire comprises, on the basis of a total weight of the core wire, alloying elements comprising:
Mn at 0.30-0.70 weight %;
Si at 0.030-0.070 weight %; and
C at 0.03-0.090 weight %.

3. The covered welding electrode of claim 2, wherein the covered welding electrode is configured such that an undiluted weld metal deposited using the covered welding electrode comprises, on the basis of a total weight of the undiluted weld metal:
C at 0.07-0.09 weight %;
Mn at 0.9-1.1 weight %;
Si at 0.35-0.45 weight %;
Ni at 2.9-3.8 weight %;
Mo at 0.75-0.85 weight %;
Cr at 0.25-0.35 weight %; and
V at 0.001-0.0150 weight %.

4. The covered welding electrode of claim 3, wherein the undiluted weld metal has a tensile strength >960 MPa and an impact strength >69 J at −60° C.

5. The covered welding electrode of claim 3, wherein the coating comprises, on the basis of the total weight of the coating, non-alloying elements comprising:
Ti at 1.8-3.8 weight %;
Ca at 15-25 weight %;
Na at 0.01-1.8 weight %;
Mg at 0.01-1.8 weight %;
K at 0.3-2.3 weight %; and
Li at 0.01-1.3 weight %,
wherein the non-alloying elements is present in a non-metallic compound form and is configured such that the non-alloying elements do not substantially get incorporated into the undiluted weld metal.

6. The covered welding electrode of claim 3, wherein the welding electrode is configured such that the undiluted weld has a diffusible hydrogen content less than 3 ml per 100 g of the undiluted weld metal.

7. The covered welding electrode of claim 1, wherein one or more of the alloying elements have, on the basis of the total weight of the coating:
Fe at 25-35 weight %;
C at 0.25-0.35 weight %;
Mn at 1.5-2.5 weight %;
Si at 5.0-6.0 weight %;
Ni at 5.0-6.0 weight %;
Mo at 1.0-2.0 weight %;
Cr at 0.01-1.0 weight %; or
V at 0.0001-0.05 weight %.

8. A covered arc welding electrode comprising:
a core wire comprising a steel composition comprising, on the basis of a total weight of the core wire, alloying elements comprising:
Mn at 0.30-0.70 weight %,
Si at 0.030-0.070 weight %,
C at 0.03-0.090 weight %; and
a coating formed on the core wire, the coating comprising alloying elements comprising Fe, C, Mn, Si, Ni, Mo, Cr and V,
wherein one or more of Fe, Si, Mo, Mn, C and Cr are present in the form of one or more ferroalloys,
wherein one or more of Fe, Mn, Ni and C are present in the form of elemental metals,
wherein one or more of the alloying elements of the coating comprises, on the basis of a total weight of the coating:
Fe at 25-35 weight %;
C at 0.25-0.35 weight %;
Mn at 1.5-2.5 weight %;
Si at 5.0-6.0 weight %;
Ni at 5.0-6.0 weight %;
Mo at 1.0-2.0 weight %;
Cr at 0.01-1.0 weight %; or
V at 0.0001-0.050 weight %, and
wherein the covered welding electrode is configured such that an undiluted weld metal deposited using the covered welding electrode has a tensile strength >960 MPa and an impact strength >69 J at −60° C.

9. The covered welding electrode of claim 8, wherein the one or more ferroalloys comprises FeSi, FeMo, FeCr, FeCrC and FeMnC.

10. The covered welding electrode of claim 8, wherein the coating further comprises calcite, calcium carbonate, fluorite, quartz and a titanium oxide.

11. The covered welding electrode of claim 8, wherein the coating further comprises magnesium fluoride, a titanium oxide and lithium carbonate.

12. The covered welding electrode of claim 8, wherein the coating further comprises one or more of a sodium silicate, a potassium silicate and sodium hydroxide.

13. A covered arc welding electrode, comprising:
a core wire comprising a steel composition; and
a coating formed on the core wire, the coating comprising weld metal alloying elements comprising Fe, C, Mn, Si, Ni, Mo, V and Cr that are arranged such that an undiluted weld metal formed from the covered welding electrode has a tensile strength >960 MPa and an impact strength >69 J at −60° C.

14. The covered welding electrode of claim 13, wherein the undiluted weld metal has a brittle-to-ductile transition temperature corresponding to a temperature at which the impact strength is about 60 J that is less than −70° C.

15. The covered welding electrode of claim 13, wherein at least a portion of one more of Fe, Si, Mo, Mn, C and Cr are present in the form of one or more ferroalloys.

16. The covered welding electrode of claim 15, wherein the one or more ferroalloys comprises FeSi, FeMo, FeCr, FeCrC and FeMnC.

17. The covered welding electrode of claim 13, wherein:
at least some of C in the form of graphite;
at least some of Mn in the form of metallic Mn;
at least some of Si in the form of a ferrosilicon;
at least some of Ni in the form of metallic Ni;
at least some of Mo in the form of a ferromolybdenum;
at least some of Cr in the form of a ferrochromium; or
at least some of V in the form of ferrovanadium.

18. The covered welding electrode of claim 13, wherein the coating comprises on the basis of a total weight of the coating, alloying elements comprising:
Fe at 15-45 weight %;
C at 0.20-0.40 weight %;
Mn at 1.0-3.0 weight %;
Si at 3.0-8.0 weight %;
Ni at 3.0-8.0 weight %;
Mo at 0.80-2.3 weight %;
Cr at 0.20-0.80 weight %; and
V at 0.0001-0.05 weight %.

19. The covered welding electrode of claim 18, wherein the coating further comprises Ti, Ca, Na, Mg, K and Li as non-alloying elements that do not substantially get incorporated into the undiluted weld metal.

20. The covered welding electrode of claim 19, wherein the non-alloying elements comprise, on the basis of the total weight of the coating:
Ti at 1.8-3.8 weight %;
Ca at 15-25 weight %;
Na at 0.01-1.8 weight %;
Mg at 0.01-1.8 weight %;
K at 0.3-2.3 weight %; and
Li at 0.01-1.3 weight %.

21. The covered welding electrode of claim 18, wherein the core wire comprises Mn at a concentration of 0.25-0.75%, Si at a concentration of 0.025-0.075%, C at a concentration of 0.03-0.09 and Fe in the amount of balance, on the basis of the total weight of the covered welding consumable electrode.

22. The covered welding electrode of claim 13, wherein the undiluted weld metal comprises, on the basis of a total weight of the undiluted weld metal:
C at 0.07-0.09 weight %;
Mn at 0.9-1.1 weight %;
Si at 0.35-0.45 weight %;
Ni at 2.9-3.8 weight %;
Mo at 0.75-0.85 weight %;
Cr at 0.25-0.35 weight %; and
V at 0.001-0.0150 weight %.

\* \* \* \* \*